(12) United States Patent
Mauz

(10) Patent No.: US 7,959,170 B2
(45) Date of Patent: Jun. 14, 2011

(54) INDEPENDENT SUSPENSION FOR A DOUBLE-WISHBONE HIGH LINK AXLE

(75) Inventor: Uwe Mauz, Esslingen (DE)

(73) Assignee: Daimler AG, Stuttgart (DE)

( * ) Notice: Subject to any disclaimer, the term of this patent is extended or adjusted under 35 U.S.C. 154(b) by 207 days.

(21) Appl. No.: 12/281,301

(22) PCT Filed: Feb. 24, 2007

(86) PCT No.: PCT/EP2007/001611
§ 371 (c)(1),
(2), (4) Date: Jan. 6, 2009

(87) PCT Pub. No.: WO2007/101568
PCT Pub. Date: Sep. 13, 2007

(65) Prior Publication Data
US 2009/0218780 A1      Sep. 3, 2009

(30) Foreign Application Priority Data
Mar. 1, 2006  (DE) .................. 10 2006 009 300

(51) Int. Cl.
*B60G 3/06* (2006.01)
*B60G 3/20* (2006.01)
*B60G 15/08* (2006.01)

(52) U.S. Cl. ... 280/124.135; 280/124.109; 280/124.134; 280/124.145

(58) Field of Classification Search ........... 280/124.109, 280/124.134, 124.135, 124.145, 124.154, 280/781, 788, 796, 124.155
See application file for complete search history.

(56) References Cited

U.S. PATENT DOCUMENTS

| | | | | |
|---|---|---|---|---|
| 3,856,323 A | * | 12/1974 | Arning et al. | 280/124.109 |
| 4,723,791 A | * | 2/1988 | Miura et al. | 280/124.109 |
| 4,811,970 A | * | 3/1989 | Cassese | 280/788 |
| 5,280,957 A | | 1/1994 | Hentschel et al. | |
| 6,398,262 B1 | | 6/2002 | Ziech et al. | |
| 6,648,351 B1 | * | 11/2003 | Kosak | 280/124.109 |
| 6,733,021 B1 | * | 5/2004 | Ziech et al. | 280/124.109 |

(Continued)

FOREIGN PATENT DOCUMENTS

DE         100 11 417 A1     9/2001

(Continued)

OTHER PUBLICATIONS

International Search Report dated Jun. 20, 2007 (five(5) pages).

*Primary Examiner* — Paul N. Dickson
*Assistant Examiner* — George D. Spisich
(74) *Attorney, Agent, or Firm* — Crowell & Moring LLP

(57) ABSTRACT

A vehicle independent suspension for a double-wishbone high link axle has on each wheel side, a wheel carrier which is mounted by at least one lower link and at least one upper link in the form of a transverse or diagonal link, on an assembly frame that is fastened to the vehicle frame. The assembly frame comprises two longitudinal members and two cross members that are fixedly connected in a force-fitting or materially joined fashion to the longitudinal members. The rear cross member is extended upward forming a link carrier for the upper link or mounting the link carrier in a dimensionally rigid manner by a support element. For each longitudinal member, a further link carrier for the upper link is arranged between the cross members; and said further link carrier engages in each case around the closest longitudinal member in a form-fitting or force-fitting or materially joined fashion.

11 Claims, 5 Drawing Sheets

| U.S. PATENT DOCUMENTS | | | | FOREIGN PATENT DOCUMENTS | | |
|---|---|---|---|---|---|---|
| 6,866,295 B2 | 3/2005 | Ziech et al. | | EP | 0 530 594 A1 | 3/1993 |
| 6,874,816 B2* | 4/2005 | Herrmann et al. ............ 280/781 | | EP | 0 940 272 A1 | 9/1999 |
| 7,380,831 B2 | 6/2008 | Ziech et al. | | WO | WO 02/26548 A1 | 4/2002 |
| 2002/0074788 A1* | 6/2002 | Fujimoto ...................... 280/781 | | WO | WO 02/053447 | 7/2002 |
| 2006/0049603 A1* | 3/2006 | Katagiri et al. ........ 280/124.109 | | * cited by examiner | | |

…

INDEPENDENT SUSPENSION FOR A DOUBLE-WISHBONE HIGH LINK AXLE

This application is a national stage of International Application No. PCT/EP2007/001611, filed Feb. 24, 2007, which claims priority under 35 U.S.C. §119 to German Patent Application No. 10 2006 009 300.3, filed Mar. 1, 2006, the entire disclosure of which is herein expressly incorporated by reference.

BACKGROUND AND SUMMARY OF THE INVENTION

The present invention relates to an independent suspension for a double-wishbone high link axle, having, on each wheel side, a wheel carrier which is mounted by means of at least one lower link and at least one upper link in the form of a transverse or diagonal link, on an assembly frame which is fastened to the vehicle frame.

German patent document DE 100 11 417 A1 discloses an independent suspension of this type. Here, however, the assembly frame is of two-part design, with the two assembly frame parts being connected to one another only by means of the vehicle frame. In order to obtain a dimensionally rigid construction with the assembly frame parts and the vehicle frame, the cross sections of the longitudinal beams of the vehicle frame must be of S-shaped design.

One object of the present invention is to provide an independent suspension for a double-wishbone high link axle which is mounted in an assembly frame, in which the assembly frame serves to mount all of the links, and in which the mounting of the upper link is of particularly dimensionally rigid design and is easy to assemble and service.

This and other objects and advantages are achieved by the independent suspension according to the invention, in which the assembly frame comprises two longitudinal members and two cross members that are connected thereto in a force-fitting or materially joined fashion. The rear cross member is extended upward, with the extension forming a link carrier for the upper link or mounting the link carrier in a dimensionally rigid manner by means of a support element. For each longitudinal member, a further link carrier for the upper link is arranged between the cross members, and engages in each case around the closest longitudinal member in a form-fitting or force-fitting or materially joined fashion.

According to the invention, an independent suspension on a vehicle frame is mounted in an assembly frame, the latter being a type of subframe which is rigidly fastened, without the interposition of elastomer bodies—to the longitudinal beams of the vehicle frame. The assembly frame therefore forms a complete front axle module together with the components of the wheel suspension, including the steering, the damping and the spring arrangement, which complete axle module is fastened as a whole to the vehicle frame.

The assembly frame is substantially a (for example) rectangular frame based on two longitudinal members and two cross members. The individual longitudinal members, which are connected to one another by means of the cross members are tubular, and have a closed, torsionally rigid cross section, such as cylindrical, conical, tetragonal, etc. The tubular longitudinal member can also have a cross section whose outer edge has an oval, elliptical or polygonal contour. The cavity of the tube can, instead, have a cross section whose contour does not correspond to the outer contour of the longitudinal member cross section. The longitudinal member may also change in terms of its cross-sectional shape and its cross-sectional area over its length.

In this way, the individual longitudinal member, which is subjected to bending loading (for example by means of the steering connection and by means of the supporting moment of the front link carrier) may also be designed to be particularly bending-resistant in special preferred directions.

In combination with the components which support the upper link, the assembly frame forms a rigid supporting structure, which is suitable inter alia for supporting the entire front end of the vehicle which is arranged in front of the front axle.

Alternatively, the independent suspension which is mounted in the assembly frame may also be used for leading axles or trailing axles with a single-tire configuration. In the case of a trailing axle, the directional specifications "front" and "rear", which are dependent on the direction of travel, must be exchanged in the following text.

Other objects, advantages and novel features of the present invention will become apparent from the following detailed description of the invention when considered in conjunction with the accompanying drawings.

DETAILED DESCRIPTION OF THE DRAWINGS

Figure 1:
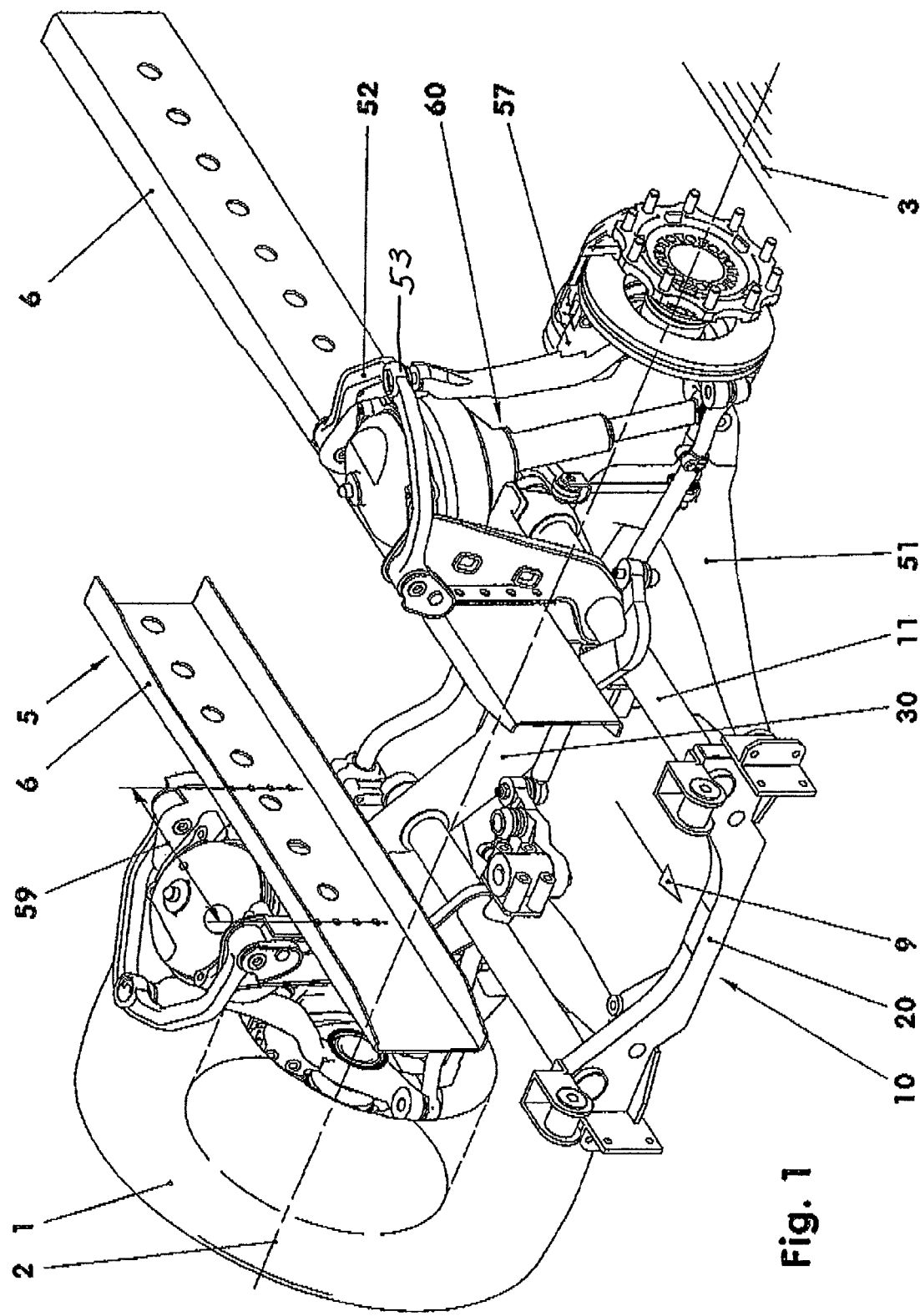
FIG. 1 shows a utility vehicle front axle with a ladder frame.

FIG. 1 shows a double-wishbone high link axle, which is fastened to a ladder frame, as a front axle of a utility vehicle with independent suspension. The front axle is for example steered, and not driven.

Figure 2:
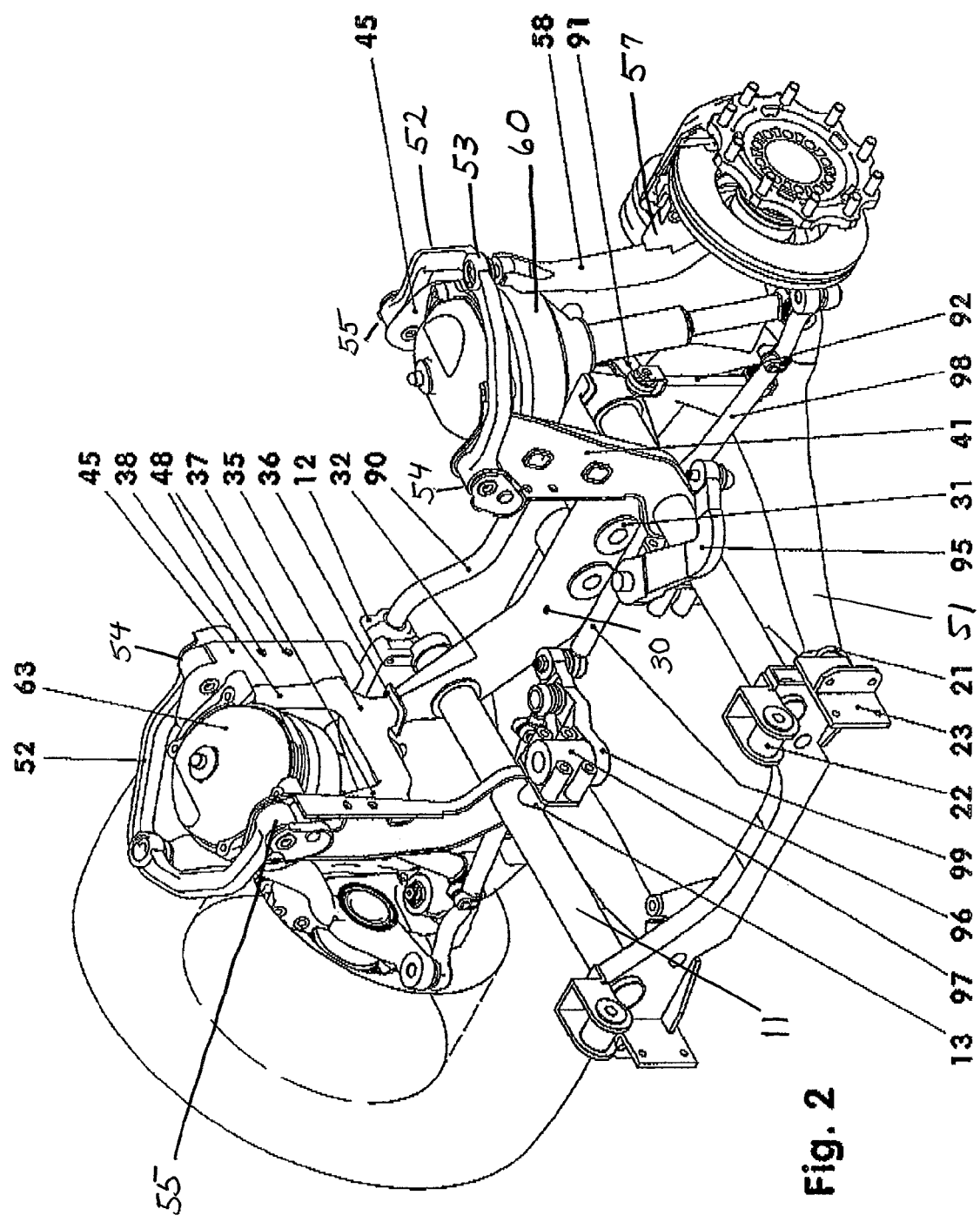
FIG. 2 is a view similar to FIG. 1, but without a ladder frame.
Figure 3:
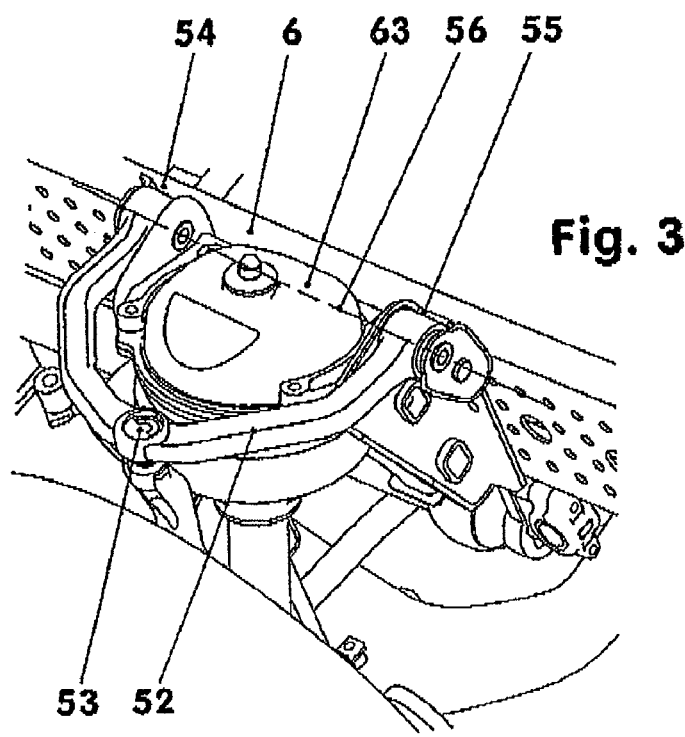
FIG. 3 shows a gas spring damper strut with an upper transverse link.

In FIG. 2, the front axle is illustrated without the longitudinal beams (6) of the vehicle frame (5). The individual independent suspension comprises inter alia a lower diagonal link (51), an upper transverse link (52), a wheel carrier (57) and a gas spring damper strut (60). The latter may also be replaced by a spring strut whose spring arrangement has, for example, at least one mechanical coil spring. The diagonal link (51) and the transverse link (52) (which may, if appropriate, be divided in each case into two individual links) are articulated on a subframe-like assembly frame (10), which is screwed directly to the vehicle frame (5) and to the longitudinal beams (6).

In the independent suspension, the upper transverse link (52) has a wheel-carrier-side joint (53) whose shortest spacing from the roadway surface—in the construction position—corresponds at least to the tire diameter of the wheel (1) which is mounted here.

The assembly frame (10) is composed of two for example parallel longitudinal members (11), two transverse members (20, 30), two fork-like support elements (35), two front (41) and two rear transverse link carriers (45). The tubular longitudinal members (11), which have for example a circular ring-shaped cross section, are aligned parallel to the longitudinal beams (6) and lie approximately at the level of the wheel rotational axis (2). (See FIG. 7.) The greatest outer diameter or the greatest width of the longitudinal members (11) is at least as large as (and may exceed by a maximum of 40%) the width (7) of the longitudinal beams (6) in the region of the double-wishbone high link axle. The wheel rotational axis (2) is for example tangent to the longitudinal members (11) at their underside in the construction position. Each longitudinal member (11) lies below the closest longitudinal beam (6). The front ends of the longitudinal members (11) are connected in a dimensionally rigid fashion by means of the front transverse member (20) and the rear ends are connected in a dimensionally rigid fashion by means of the rear transverse member (30).

The longitudinal members (11) are welded to the cross members (20, 30) so as to form an at least approximately rectangular frame as viewed in plan view. The cross members are doubly bent tetragonal tubes which vary in terms of their cross sectional area and shape multiple times over their longitudinal extent. The transverse members are bent downward at least approximately in the shape of a sickle in order to create a corresponding space for the vehicle engine which is situated in this region between the longitudinal beams (6). Despite the curvature, the imaginary curved central lines of the cross members (20, 30) lie in an at least approximately vertically aligned vehicle transverse plane. Moreover, the imaginary central lines of the longitudinal members (11) and of the cross members (20, 30) define a frame whose equal diagonals have a length that corresponds to at least twice the spacing between the vehicle contact surface and the wheel rotational axis. Here, the front cross member (20) is situated in front of the wheel rotational axis (2), while the rear cross member (30) is situated behind said wheel rotational axis (2).

The rear cross member (30) ends at both sides—a short distance below the longitudinal beams (6)—in each case in a flange (32) onto which the upwardly projecting fork-like support elements (35) are welded.

Each of the latter has front and rear arms (37, 38), which are at least approximately parallel, have a spacing relative to one another which is such that a gas spring damper strut (60) fits in between with its bellows region with a play of several millimeters or centimeters. (See FIG. 2.)

A lower end flange (36) of the respective support element (35) has a shorter spacing to the rear arm (38) than to the front arm (37). The difference is approximately one-third of the total arm spacing.

Each rear arm (38) engages in a form-fitting manner into the respective rear transverse member carrier (45). The front arms (37) are connected in the same way to the front transverse link carriers (41). In addition to the form-fitting action, the arms (37, 38) and the transverse link carriers (41, 45) are welded to one another. The front transverse link carriers (41) are extended downward and additionally engage around in each case the closest tubular longitudinal member (11). The lower end, which engages around the longitudinal member (11), of the front transverse link carrier (41) is welded to the longitudinal member (11).

As an alternative to mounting the transverse link carriers (41, 45) on a carrier element (35) which is mounted on the rear cross member (30), the rear transverse link carrier (45) can be directly flange-mounted on one of the flanges (32). In order to dispense with the need for the support element (35), at least the rear transverse link carrier (45) may be designed so as to be dimensionally rigid in the vehicle longitudinal direction. For this purpose, the rear transverse link carrier has for example ribs (49) which are situated in an at least approximately vertical vehicle longitudinal plane. (See FIG. 7.)

The transverse link carrier (41) which is situated at the front in FIGS. 1 and 2 is fastened in a rotationally rigid fashion to the longitudinal carrier (11). The normal forces (14) and side forces (16, 18) (FIG. 7) which act on the corresponding wheel therefore act as torques (15) and (17, 19) on the longitudinal member (11). Since the latter, as a tube with a closed cross section, has an extremely high level of torsional rigidity, the normal forces and side forces lead only to minimal torsional deformations. As a result, the lateral forces (8) which act via the transverse link carrier (41) on the longitudinal beams (6) are so low that it is possible to dispense with an additional axle bridge—which stiffens the longitudinal beams (6)—in the direct vicinity of the double-wishbone high link axle.

The rear transverse link carriers (45) are supported, according to FIGS. 1 and 2, on the carrier elements (35). The latter are seated by means of the flanges (36) on the rear cross member (30). The cross member (30) and the carrier element (35) form—around the vehicle longitudinal axis—a bending-resistant support.

Figure 7:
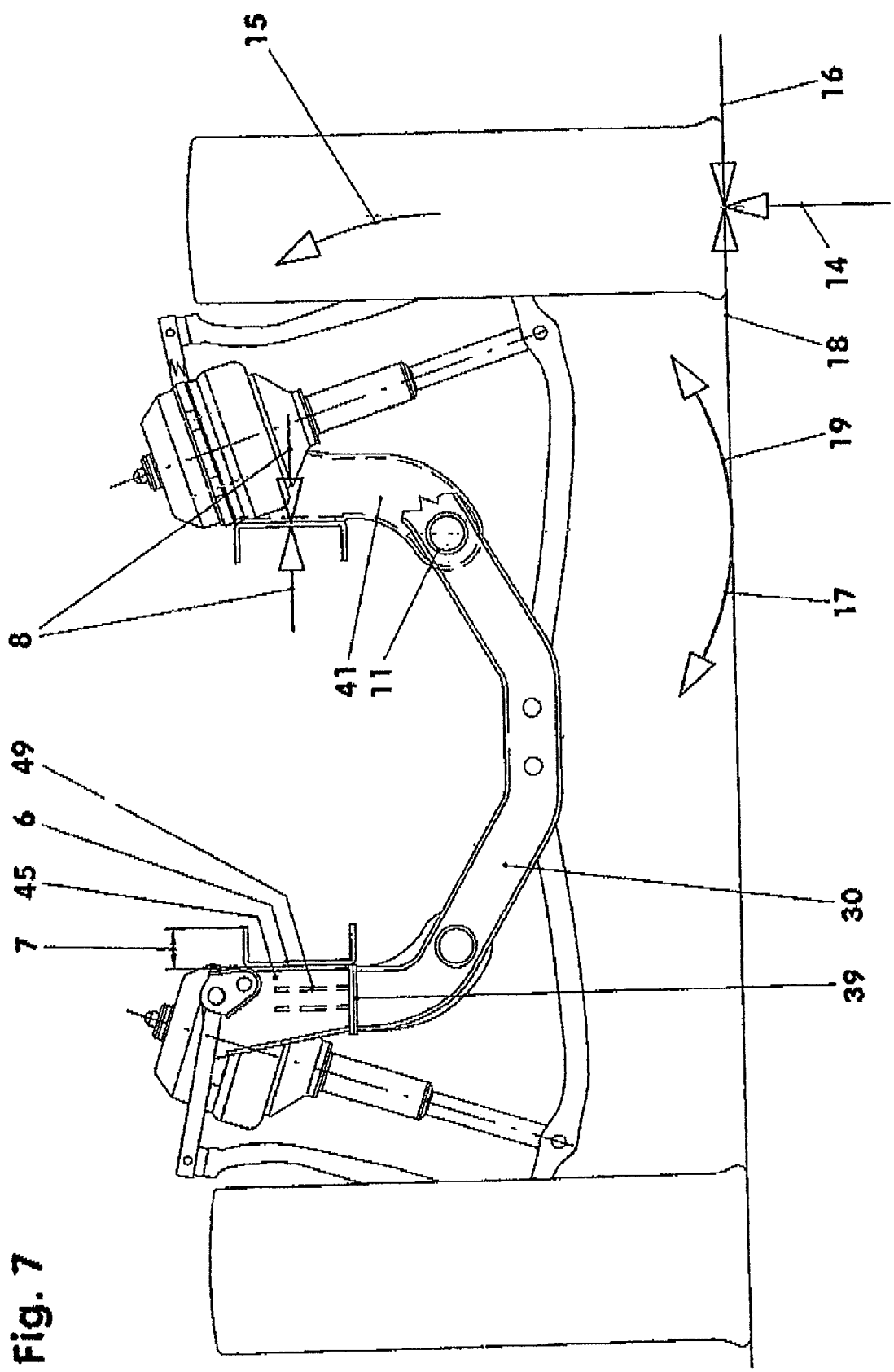
FIG. 7 shows a rear view of a double-wishbone high link axle.

According to FIG. 7, the rear transverse link carrier (45) is screwed directly via the flanges (39) to the rear cross member (30). Here, the cross member (30) and the transverse link carrier (45) directly form a bending-resistant support.

Figure 4:
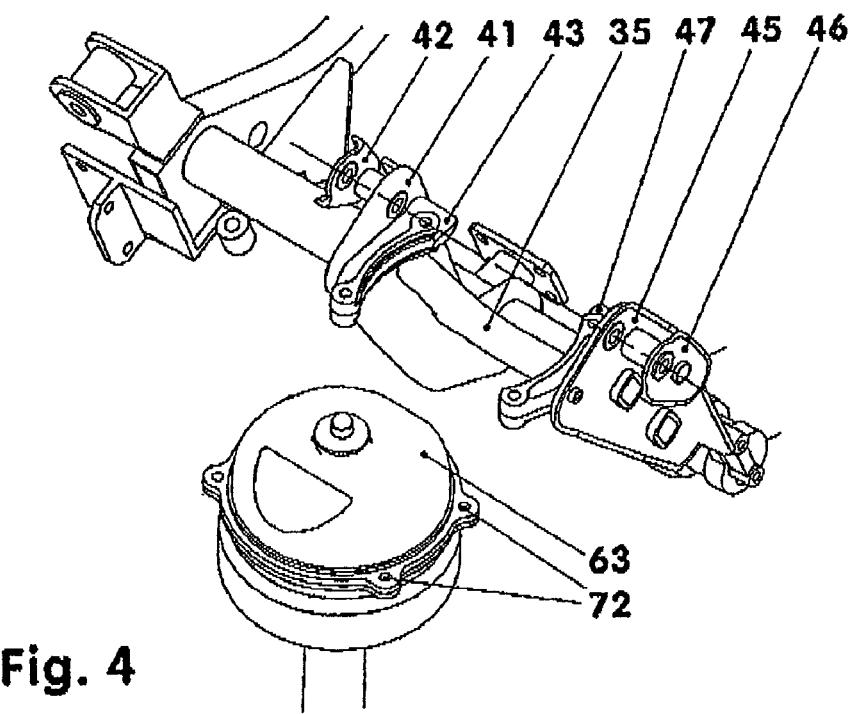
FIG. 4 is a view similar to FIG. 3, but with the gas spring damper strut dismounted and without the upper transverse link.

In order to hold the vehicle-body-side transverse link joints (54, 55), the four transverse link carriers (41, 45) are of fork-shaped design at their upper ends. (See also FIG. 4.) For this purpose, additional fork lugs (42, 46) are welded to the transverse link carriers (41, 45). The vehicle-body-side transverse link joints (54, 55) of the transverse links (52) have for example a horizontal pivot axis (56) which is also aligned at least approximately parallel to the direction of travel (9). Below the joint region, the transverse link carriers (41,45), which are arranged in pairs at each wheel side, support, on the surfaces which face toward one another, fastening brackets (43, 47) for mounting the gas spring damper strut (60). The dimensionally rigid fastening brackets (43, 47) have for example in each case two bores and a sickle-shaped contour which is aligned in the direction of the gas spring damper strut (60). The sickle-shaped contour is intended to permit the most form-fitting contact possible against the gas spring damper strut (60).

According to FIG. 2, the transverse link carriers (41, 45), which are of angular design in regions, have a plurality of bores (48), through which the assembly frame (10) is screwed to the longitudinal beams (6) of the ladder frame (5). (See FIGS. 1 and 2.) Here, the transverse link carriers (41, 45) of one wheel side have, on the corresponding longitudinal beam (6), a fastening spacing (59) which is shorter than half of the mean spacing between the cross members (20) and (30).

The front cross member (20) carries three fastening points at each end. The spatially lowest fastening points are the front mounts (21) of the diagonal links (51). Fastening points (joints 22) which are arranged in the upper region of the cross member (20) provide an articulated connection of leaf springs of a rigid axle which may optionally be installed, or may be installed in a so-called "second vehicle life cycle". points in the form of angular adapters (23) are situated at the end sides of the front cross member (20) for fastening an impact shock absorber, the so-called crash box.

The rear mounts (31) of the lower diagonal links (51) are arranged on the rear cross member (30) in the central region. At the chassis side the wheel carrier (57) is articulated on the diagonal links (51) which are situated below a horizontal wheel central plane (3), and is articulated on the wheel-carrier-side joint (53) of the upper transverse link (52) by means of a vertically aligned wheel carrier arm (58).

Installed between the lower diagonal link (51) and the upper transverse link (52) is the gas spring damper strut (60). Its central line (61) is (measured in a vertical projection onto an imaginary vertical vehicle transverse plane) inclined by 15 to 20 degrees, (FIG. 7), so that the two upper vehicle-body-side articulation points of the gas spring damper struts (60) of an axle are situated closer to one another than the corresponding lower, chassis-side articulation points. A projection of the central line (61) onto a vertical vehicle longitudinal plane is inclined by for example 2-4 degrees with respect to the vertical, with the lower articulation points preceding the upper articulation points in the direction of travel (9).

The air spring arrangement (62) (FIG. 6) or the gas spring component of the gas spring damper strut (60) is arranged in a space which is delimited with play by the respective longitudinal beam (6), the corresponding fork-like carrier element (35), the transverse link carriers (41, 45), the transverse link (42) and the wheel carrier arm (57).

Figure 5:
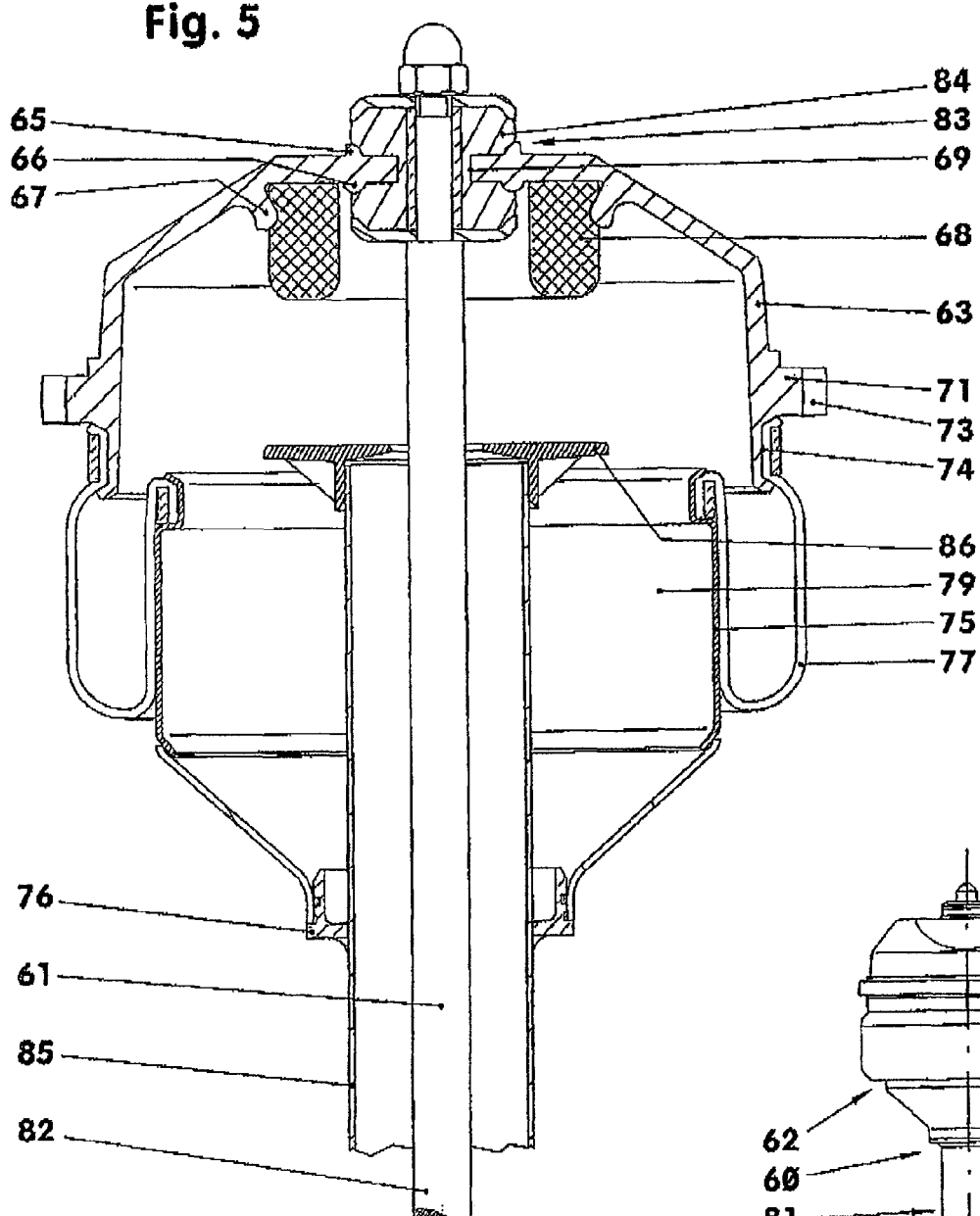
FIG. 5 shows a longitudinal section through a gas spring damper strut.
Figure 6:
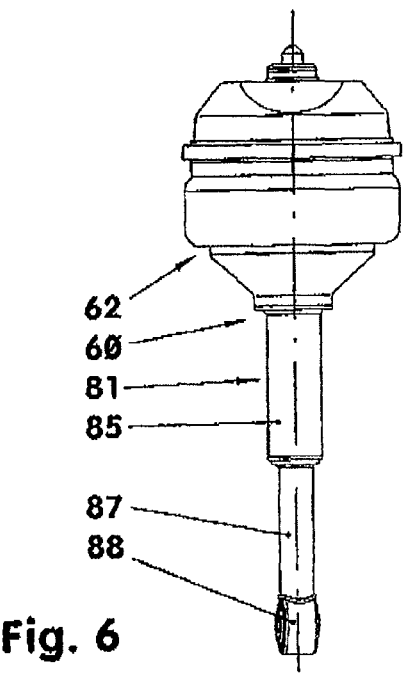
FIG. 6 is a side view of a gas spring damper strut, reduced in size.

The gas spring damper strut (60) comprises a shock absorber (81). Of the latter, FIGS. 5 and 6 illustrate firstly the damper tube (85), with an extension (87) and joint eye (88), and secondly the piston rod (82) with its upper articulated supporting mount (83). According to FIGS. 1 and 2, the joint eye (88) is mounted on the diagonal link (51) in the vicinity of the lower wheel carrier joint. The supporting mount (83) is mounted in the dimensionally rigid head plate, which is designed as a support pot (63), of the gas spring (62).

The single-piece support pot (63), which is produced for example from steel, has a pot shape which is composed in appearance of a frustoconical casing and a cylindrical casing. In the cylindrical casing region, the support pot (63) has an encircling stiffening rib (71) in which are arranged for example four threaded bores (72). (See FIG. 4.) For this purpose, the rib (71) is widened in the region of the bores (72). In the case of a gas spring damper strut (60) being installed in the assembly frame (10), the rib (71) bears from below in a form-fitting and force-fitting manner against the fastening brackets (43, 47) of the transverse link carriers (41, 45).

To hold the supporting mount (83), the support pot (63) has a central bore (69) and for example two annular webs, one (66) at the inside and one (65) at the outside. The elastomer body (84) of the supporting mount (83) is securely positioned on the annular webs (65, 66). The elastomer body (84) is seated (screwed) on the piston rod end, so as to be clamped between two disks which are held with a spacing to one another by means of a sleeve.

Arranged around the supporting mount (83), in the displacer space (79), is an annular rubber buffer (68) as a mechanical spring stroke limiter. Said rubber buffer (68) is held by a further annular web (67) which stiffens the support pot (63) at the inside. When the wheel (1) is completely compressed, the stop plate (86) which is arranged at the upper end of the damper tube (85) comes into contact with the rubber buffer (68).

As shown in FIG. 5, a spring plate (76), which is welded to the damper tube (85), supports a rolling piston (75) with for example a cylindrical bellows rolling region. A hose rolling bellows (77) arranged between the rolling piston (75) and the support pot (63) is held on the rolling piston (75) and on the support pot (63) in each case by means of a clamping ring. For this purpose, corresponding encircling beads are provided in the rolling piston (75) and in the support pot (63). The bead (74) of the support pot (63) is situated directly below the stiffening rib (71).

Within the gas spring damper strut (60), the piston rod (82) of the shock absorber (81) serves as a linear guide for the gas spring arrangement (62).

In the embodiment according to FIGS. 1-6, the support pot (63) performs four independent functions. First, it stiffens the mount of the upper transverse link (52). Together with the transverse link carriers (41, 45), the longitudinal member (11) and the support element (35), it also forms a particularly dimensionally rigid assembly, whose torsional stiffness is additionally increased by means of the screw connection to the ladder frame (5). Furthermore, the support pot (63) holds the supporting mount (83) of the shock absorber (81), so that it is unnecessary for the supporting mount (83) to be separately articulated to the vehicle body (5).

Furthermore, when installing the gas spring damper strut (60) into the assembly subframe (10), it is possible to set the joint play of the joints (54, 55) by means of the screw connection of the support pot (63) to the transverse link carriers (41, 45) or by means of the fastening brackets (43, 47) thereof. The reason for the previous adjustment requirement was that of the pressing of the elastomer joints (54, 55) into the joint eyes of the upper transverse link (52). The pressed-in position of the elastomer joints (54, 55) is for example provided with a tolerance of 0.75 millimeters. In the worst case, the mount spacing may vary by 1.5 millimeters.

In order to prevent jamming of the link pivoting movement, the frame-side mounts have previously been adjustable. Here, however, the transverse link (52) is inserted with its elastomer joints (54, 55) on the transverse link carriers (41, 45), and the spacing between the transverse link carriers (41, 45)—of one wheel side—is varied such that the transverse link (52) can be moved with minimum play and without jamming. In that position, the support pot (63) is screwed to the transverse link carriers. During subsequent mounting of the assembly frame (10) on the ladder frame (5), the link play setting is secured once again by screwing the transverse link carriers (41, 45) to the longitudinal beams (6), such that, during servicing, the gas spring damper strut (60) may be exchanged without adjusting the link play in the process.

Not least, the bulging of the support pot (63) serves to considerably enlarge the displacer space (79), which is utilized to adapt the gas spring rate.

Between the longitudinal members (11) and the diagonal links (51), the outer track rods (98), which are parts of the steering and are arranged in front of the wheel rotational axis (2), end in the central axle region at the intermediate steering levers (96). The latter are coupled to one another by means of the central track rod (99) and are mounted in intermediate steering lever bearings (97). The intermediate steering levers (97) are arranged on the longitudinal beams (11) for example by means of short, inwardly projecting jibs (13). The steering lever (95) is rotationally rigidly fastened to the driver-side intermediate steering lever (96).

A U-shaped stabilizer (90), which is for example multiply cranked, and is arranged behind the rear cross member (30), is pivotably mounted by means of screw-type clip adapters (12) on the rear ends of the longitudinal members (11). The ends of the stabilizer lever arms (91) are articulatedly supported by coupling rods (92) on the lower diagonal links (51). The coupling rods (92) are aligned at least approximately vertically in the construction position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| | List of reference symbols |
|---|---|
| 1 | Wheel |
| 2 | Wheel rotational axes, central line |
| 3 | Horizontal plane through (2) |
| 5 | Vehicle frame, vehicle body |
| 6 | Longitudinal beams of the ladder frame (5) |
| 7 | Width of the longitudinal beams (6) |
| 8 | Lateral forces |
| 9 | Direction of travel |
| 10 | Assembly frame |
| 11 | Longitudinal member, tubular, right, left |
| 12 | Screw-type clip adapter, stabilizer mount |
| 13 | Jibs for the steering |
| 14 | Normal force (counter to wheel contact force) |
| 15 | Moment as a result of (14) |
| 16 | Side force when cornering |
| 17 | Moment as a result of (16) |
| 18 | Side force when cornering |
| 19 | Moment as a result of (18) |
| 20 | Cross member, front |
| 21 | Diagonal link mount, front |
| 22 | Leaf spring joints, alternative |
| 23 | Adapter for crash box |
| 30 | Cross member, rear |
| 31 | Diagonal link mount, rear |
| 32 | Traverse flange |
| 35 | Support element, fork-like |
| 36 | Flange, foot side |
| 37 | Arm, front |
| 38 | Arm, rear |
| 39 | Flanges |
| 41 | Transverse link carrier, link carrier, front |
| 42 | Fork lugs |
| 43 | Fastening brackets |
| 45 | Transverse link carrier, link carrier, rear |
| 46 | Fork lugs |
| 47 | Fastening brackets |
| 48 | Bores in (47) |
| 49 | Ribs |
| 51 | Diagonal link, lower |
| 52 | Transverse link, upper |
| 53 | Joint, chassis-side, wheel-carrier-side |
| 54, 55 | Joints, vehicle-body-side |
| 56 | Pivot axis |
| 57 | Wheel carrier |
| 58 | Wheel carrier arm |
| 59 | Fastening spacing |
| 60 | Gas spring damper strut |
| 61 | Central line |
| 62 | Gas spring, air spring arrangement, vehicle suspension |
| 63 | Support pot, spring strut pot, head plate |
| 64 | Support flange |
| 65 | Annular web, outer |
| 66 | Annular web, inner |
| 67 | Annular web, inner, for (68) |
| 68 | Rubber buffer |
| 69 | Bore, central |
| 71 | Stiffening rib |
| 72 | Threaded bores |
| 73 | Widened portions |
| 74 | Bead, encircling |
| 75 | Rolling piston |
| 76 | Spring plate |
| 77 | Bellows, hose rolling bellows |
| 79 | Displacer space |
| 81 | Shock absorber |
| 82 | Piston rod |
| 83 | Supporting mount, piston rod joint, elastic |
| 84 | Elastomer body |
| 85 | Damper tube, damper cylinder |
| 86 | Stop plate |
| 87 | Extension |
| 88 | Joint eye |
| 90 | U-shaped stabilizer |
| 91 | Stabilizer arms |
| 92 | Coupling rods |
| 95 | Steering lever |
| 96 | Intermediate steering lever |
| 97 | Intermediate steering lever bearing |
| 98 | Track rods, outer |
| 99 | Track rod, center |

The invention claimed is:

1. An independent suspension for a vehicle having a vehicle frame, said independent suspension comprising a double-wishbone high link axle with a wheel carrier on each side thereof, wherein:
said wheel carrier is mounted by at least one lower link and at least one upper link in the form of a transverse or diagonal link, on an assembly frame that is fastened to the vehicle frame;
the assembly frame comprises two longitudinal members and two cross members;
the cross members are fixedly connected in a force-fitting or materially joined fashion to the longitudinal members;
the rear cross member is extended upward forming a link carrier for the upper link or mounting the link carrier for the upper link in a dimensionally rigid manner by a support element;
for each longitudinal member, a further link carrier for the upper link is arranged between the cross members; and
said further link carrier engages in each case around the closest longitudinal member in a form-fitting or force-fitting or materially joined fashion.

2. The independent suspension as claimed in claim 1, wherein the longitudinal members are tubes with a circular cross section.

3. The independent suspension as claimed in claim 1, wherein the longitudinal members have a substantially constant cross section over their length.

4. The independent suspension as claimed in claim 1, wherein an outer diameter or the width of the longitudinal members is at least as large as, and exceeds a width of longitudinal beams of the vehicle frame by a maximum of 40%, in the region of the double-wishbone high link axle.

5. The independent suspension as claimed in claim 1, wherein the longitudinal members are arranged spatially below longitudinal beams of the vehicle frame.

6. The independent suspension as claimed in claim 1, wherein the longitudinal members and the cross members are connected to one another substantially at right angles.

7. The independent suspension as claimed in claim 6, wherein imaginary central lines of the longitudinal members and of the cross members define a frame whose diagonals are equal.

8. The independent suspension as claimed in claim 6, wherein the link carriers of one wheel side are connected to one another in a form-fitting and/or force-fitting manner in the region of the vehicle-body-side joints of the upper link, by a dimensionally rigid component of the vehicle suspension.

9. The independent suspension as claimed in claim 8, wherein the form-fitting and/or force-fitting connection between the component and the link carriers is detachable.

10. The independent suspension as claimed in claim 1, wherein ground clearance of the rear cross member is less than half of ground clearance of the longitudinal beams of the vehicle frame.

11. The independent suspension as claimed in claim 1, wherein the link carriers of one wheel side are fastened to the corresponding longitudinal beam with a spacing such that each respective further link is closer to the rear cross member than to the front cross member.

* * * * *